United States Patent [19]

Green et al.

[11] Patent Number: 5,794,242

[45] Date of Patent: Aug. 11, 1998

[54] TEMPORALLY AND SPATIALLY ORGANIZED DATABASE

[75] Inventors: Russell J. Green; J. Christopher Davies; Alan J. Paxton, all of Edinburgh; Christopher Whitaker, West Lothian, all of Scotland

[73] Assignee: Digital Equipment Corporation, Maynard, Mass.

[21] Appl. No.: 835,553

[22] Filed: Apr. 8, 1997

Related U.S. Application Data

[63] Continuation of Ser. No. 384,994, Feb. 7, 1995, abandoned.

[51] Int. Cl.[6] .................................................. G06F 17/30
[52] U.S. Cl. ......................................... 707/10; 707/204
[58] Field of Search .................................... 395/792, 618, 395/613, 122; 348/433; 400/223; 707/10, 204

[56] References Cited

U.S. PATENT DOCUMENTS

| | | | |
|---|---|---|---|
| 4,558,413 | 12/1985 | Schmidt et al. | 364/300 |
| 4,646,229 | 2/1987 | Boyle | 364/200 |
| 4,903,125 | 2/1990 | Parker | 348/437 |

(List continued on next page.)

OTHER PUBLICATIONS

"The Push to 64-Bit Systems: Top Vendors Plan Move to Advanced Microprocessors", Information Week, pp. 108, Dec. 1995.

"Digital Hoping to Win Over SIs, VARs to New Strategy Adds Microsoft's Win32 API's into Open VMS", Computer Reseller News, pp. 22. Dec., 1995.

"High-Speed Data Back-Up", Data Trends Publications, v. 3, No. 24, Dec. 12, 1995.

Green et al., "Designing a Fast, On-line Backup System for a Log-Structured File System", Digital Technical Journal, v. 8, No. 2, pp. 32-45 (Abstract), 1996.

M. Rosenblum, et al., "The Design and Implementation of a Log-Structured File System", AMC Transactions on Computer Systems, vol. 10, No. 1, Feb. 1992, pp. 26-52.

M. Rosenblum, "The Design and Implementation of a Log-Structured File System", U.M.I. Dissteration Services, 1992.

Quinlan, S., "A Cached WORM File System", Software-Practice and Experience, vol. 21(12), Dec. 1991, pp. 1289-1299.

Lomet et al., "Exploiting a History Database for Backup", DB:IEEE/INSPEC Update and Additions, 19th International Conference on Very Large Data Bases Proceedings, Abstract, Aug. 24, 1993.

Whitehorn, Mark "Safety Net", PC User, No. 197, p. 69(2), Nov. 4, 1992.

Peterson et al., "Network Backup Evolves", PC Magazine, v.12, p. 277(18), Sep. 28, 1993.

Ballou, Melinda-Carol "Object Database Forms Repository for Speech, Video data on VMS", Digital Review, v. 8, No. 30, p. 9(2), Sep. 9, 1991.

*Primary Examiner*—Thomas G. Black
*Assistant Examiner*—Charles L. Rones
*Attorney, Agent, or Firm*—Michael A. Rodriguez; Dirk Brinkman

[57] ABSTRACT

During operation of a computer system, index records and data records of a data structure are organized in a hierarchical manner, with index records being at a higher level of the hierarchy than the data records referenced by the index records. While the data structure is manipulated, the data records are stored in a random access memory. Modifications made to the data structure are chronologically written to a disk storage in a bottom-first/top-last order of the hierarchy for persistent storage as a database. A back-up copy of the database is made by storing the data and index records of the database in a top-first/bottom-last order on a sequentially readable media. A temporal and spatial view of a portion of the database can be obtained by accessing the index records and the data records of the database or the back-up media in the top-first/bottom last order.

11 Claims, 9 Drawing Sheets

U.S. PATENT DOCUMENTS

| | | | |
|---|---|---|---|
| 4,952,086 | 8/1990 | Watari et al. | 400/223 |
| 5,043,866 | 8/1991 | Myre, Jr. et al. | 364/200 |
| 5,043,871 | 8/1991 | Nishigaki et al. | 364/200 |
| 5,163,148 | 11/1992 | Walls | 395/600 |
| 5,175,814 | 12/1992 | Arnick et al. | 395/161 |
| 5,193,185 | 3/1993 | Lanter | 395/600 |
| 5,204,958 | 4/1993 | Cheng et al. | 395/600 |
| 5,212,788 | 5/1993 | Lomet et al. | 395/600 |
| 5,274,799 | 12/1993 | Brant et al. | 395/575 |
| 5,276,872 | 1/1994 | Lomet et al. | 395/600 |
| 5,287,501 | 2/1994 | Lomet et al. | 395/600 |
| 5,335,343 | 8/1994 | Lampson et al. | 395/575 |
| 5,347,653 | 9/1994 | Flynn et al. | 395/600 |
| 5,390,302 | 2/1995 | Johnson et al. | 395/325 |
| 5,396,757 | 3/1995 | Spiro et al. | 395/575 |
| 5,414,840 | 5/1995 | Rengarajan et al. | 395/600 |
| 5,440,732 | 8/1995 | Lomet et al. | 395/600 |
| 5,446,884 | 8/1995 | Schwendermann et al. | 395/600 |
| 5,459,864 | 10/1995 | Brent et al. | 395/650 |
| 5,487,607 | 1/1996 | Lomet et al. | 395/600 |
| 5,488,716 | 1/1996 | Schneider et al. | 395/182.08 |
| 5,495,607 | 2/1996 | Pisello et al. | 707/10 |
| 5,513,306 | 4/1996 | Mills et al. | 395/792 |
| 5,515,502 | 5/1996 | Wood | 395/182.13 |
| 5,579,455 | 11/1996 | Greene et al. | 395/122 |
| 5,592,667 | 1/1997 | Bugajski | 395/613 |

TEMPORALLY AND SPATIALLY ORGANIZED DATABASE

This application is a continuation of application Ser. No. 08/384,994, filed Feb. 7, 1995 and now abandoned.

FIELD OF THE INVENTION

This invention relates to computer systems, and more particularly to a method and apparatus for persistently maintaining a data structure of a computer system as a database.

BACKGROUND OF THE INVENTION

Data structures are used to organize information processed by computer systems. The information of the data structure is generally stored in a random access memory (RAM) of the computer while it is manipulated. If the data structure is larger than can be accommodated in the RAM, the structure can further be organized as a database and persistently stored on a randomly accessible disk storage device. For safe-keeping, copies of the database may also be maintained on low-cost sequential storage media, such as magnetic tape.

Data structures change in space and time. Traditional data structures have usually organized the spatial relationship of the information to gain processing efficiencies. In most known databases, efficiencies are gained by controlling the logical-to-physical mapping of the data structures to improve access to the data. For example, a typical database may include index records and data records organized hierarchically as nodes in a B-tree. A known location usually stores a pointer to a root node of the tree. The root node then includes pointers to other index nodes in the hierarchy. Bottom level index nodes include pointers to the data records. The pointers are nothing more than addresses which allow the system to physically locate the nodes and the data records.

Associated with the data records are keys. The keys uniquely identify individual records. The keys, or ranges of keys, can also be associated with the index records to define access paths to particular data records. Thus, during operation of the database, the keys can be used to selectively follow the pointers to the physical location of the particular data records.

Although spatially organized data structures can have good random access characteristics while preserving a sequential key ordering, other operations may suffer. In most computer systems, a frequent and important task is to make a back-up copy of the database on, for example, a removable media. While making the back-up copy, most computer systems prohibit database modification so that the back-up copy is a consistent image of the database at a particular instant in time. For very large databases, the period of time that the database remains inaccessible is a serious operational problem. As an additional problem with prior art databases, it is difficult to selectively restore data from a physical back-up copy without having a duplicate media to receive the entire back-up copy during restoration.

To reduce the time that the database is unavailable some computers systems perform the back-up incrementally. In an incremental back-up, only data modified since the last back-up are copied to the back-up media. Thus a full back-up, and all subsequent incremental back-ups can be used to restore the database after a system failure.

In order to perform incremental back-ups, the temporal relationship of data must be known. This means, that the back-up procedure must be able to identify the data which have been modified since the last back-up.

However, in most traditional spatially organized databases, the data are modified in place, and the historical evolution of the data is lost. A separately maintained journal, including time-stamped database transactions, can be used to record database modifications. However, a journal burdens the system with additional complexities. In addition, selective restoration from a journal, which is only organized temporally, can be excessively time consuming, since the required spatial relationships of the recovered data must be reconstructed.

Another problem, which is usually not handled efficiently by traditional databases, is to view or select a portion of the database using time-based constraints. A typical database task can be to identify data which not only satisfies predetermined logical selection criteria, but also temporal selection criteria. For example, locate all accounts which have been modified in the last twenty-four hours. In most systems, where time-stamps are maintained with the data records, it is usually necessary to first read all the records which logically qualify the data, and then second, to further qualify the data using the time-based constraints. Alternatively, if a journal is used, the two steps of the operation are usually performed in a reverse order. In most databases it is not possible to select data using both spatial and temporal constraints concurrently.

In general, traditional spatially organized databases are not well suited for temporally dependent operations, and spatial operations on temporally organized data structures are equally difficult.

It is desired to organize a data structure of a database so that both temporal and spatial dependent operations can be performed efficiently.

SUMMARY OF THE INVENTION

During operation of a computer system, index records and data records of a data structure are organized in a hierarchical manner, with index records being at a higher level of the hierarchy than the data records. While the data structure is manipulated, the affected data records are stored in a random access memory. Modifications made to the data structure are chronologically written to a disk storage in a bottom-first/top-last order of the hierarchy for persistent storage as a database. A back-up copy of the database is made by storing the data and index records of the database in a top-first/bottom-last order on a sequentially readable back-up media. A temporal and spatial view of a portion of the database can be obtained by accessing the index records and the data records of the database or the back-up media in the top-first/bottom last order.

The data records and index records are transferred between the random access memory and the disk storage as segments. Associated with each segment is a unique logical segment number. Monotonically increasing logical segment numbers are assigned to the segments when the segments are written to the disk storage. A home location stores the logical segment number of a highest segment number written to the disk drive and a time of the writing of the segment having the highest logical segment number.

During a back-up operation, the segments are read in a reverse chronological order from the disk storage, and the segments are written in the reverse chronological order to the back-up media. The back-up media thus providing a top-first/bottom-last arrangement of the index records and data records to permit a time-based restore of selected index and data records while reading the back-up media in a single forward direction.

DETAILED DESCRIPTION OF A PREFERRED EMBODIMENT

Figure 1:
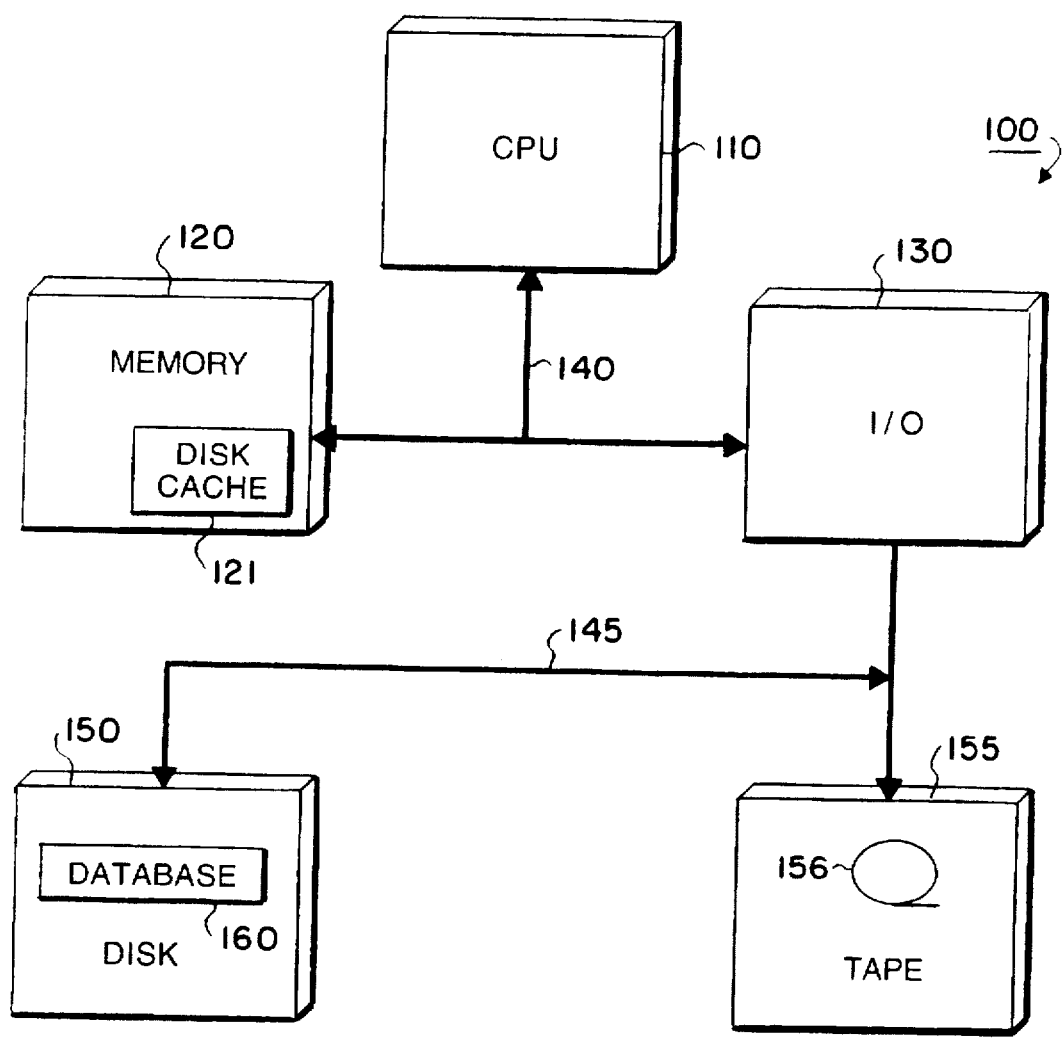
FIG. 1 is a block diagram of a computer system have a data structure organized according to the principles of the invention.

FIG. 1 shows a computer system 100 including a central processor unit (CPU) 110, a memory 120, and an I/O sub-system 130 connected to each other by a communications bus 140. Bulk random access storage media 150 including, for examples, one or more disk drives, is connected to the I/O sub-system 130 by an I/O bus 145. A portion of the memory 120 may be allocated as a disk cache 121 to take advantage of localities of information processed by the system 100. The system 100 can also include a tape drive 155 for storing a copy of processed information on a sequentially accessible and removable media, for example, a magnetic tape 156. The information stored in the media of the storage device 150 can be organized as a database 160. The database 160 organizes the information or "data" to facilitate access and reliability.

During operation of the computer system 100, portions of the database 160 are read into the disk cache 121 for processing by the CPU 110. After the data are processed, the modified data are written back to the disk 150 for persistent storage.

Figure 2:
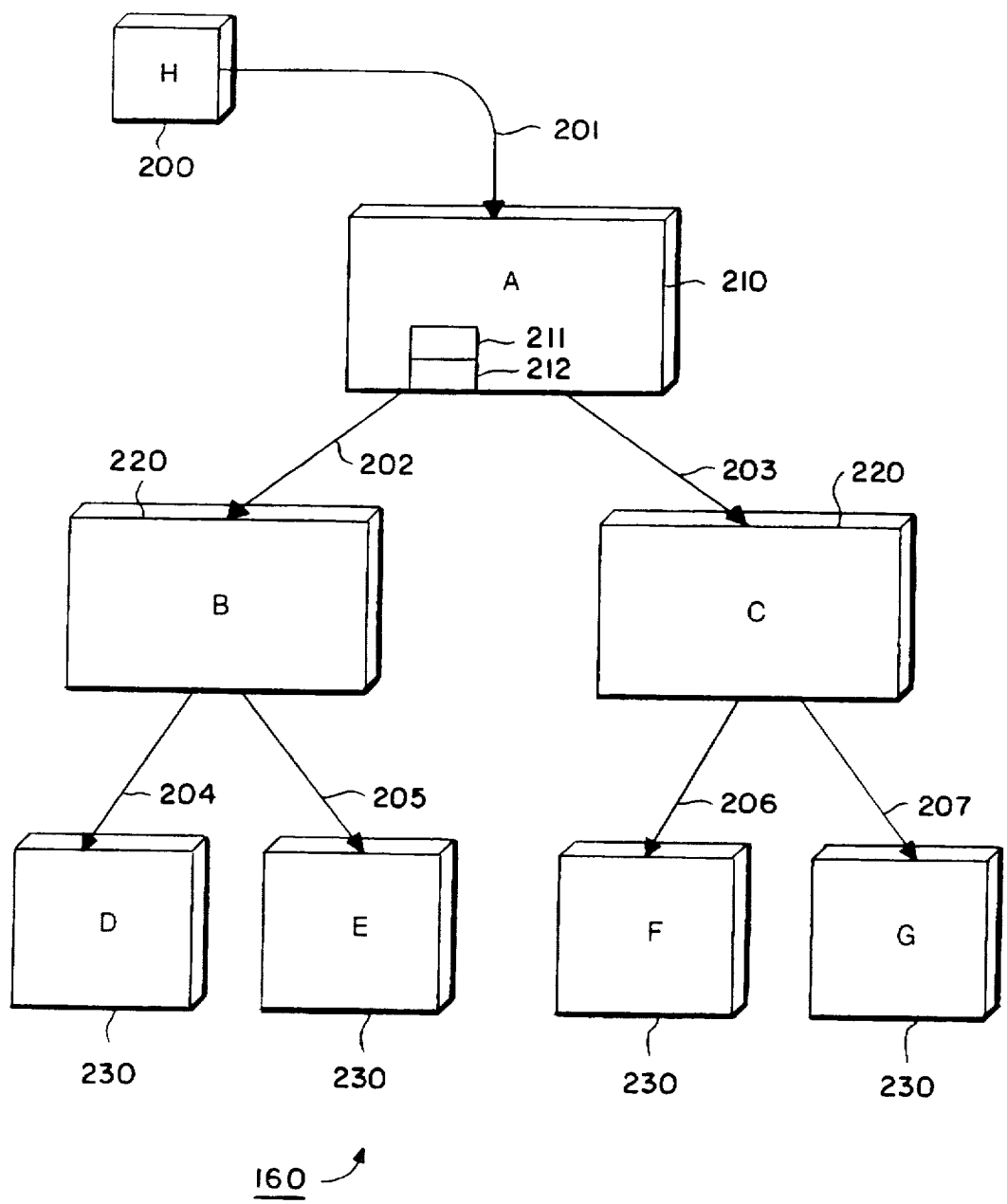
FIG. 2 is a block diagram of a hierarchical data structure at a first instant in time.

FIG. 2 shows the logical structure of the database 160 as a directed graph at some time T1. In the exemplary embodiment, the database 160 is logically organized in a hierarchical manner as an inverted "tree" 200. The tree 200 includes a top-level index or "root" node 210, intermediate-level index nodes 220, and bottom-level data nodes 230, sometimes called "leaf nodes." In order to facilitate the description of the exemplary embodiment of the invention, the nodes are labelled A–G. The index nodes (A, B, and C) include index records and the data nodes (D, E, F, and G) include data records. It should be understood, that the hierarchy can include multiple levels of index nodes, and that each index nodes can include a plurality of index records.

The network which holds the structure 160 together are the pointers 201–207. For example, the pointer 201 which locates the structure 160 is usually stored at some known "home" location (H) 200. During operation of the database, the data records are physically accessed by following the pointers 201–207, e.g., the index records, according to a predetermined selection criteria. Therefore, associated with each pointer or index record of the tree is an address 211 and a criteria sensitive key 212. Typically, the key 212 can be used to uniquely identify a particular data records. This type of database organization can be used for complex file systems and relational databases.

Figure 3:
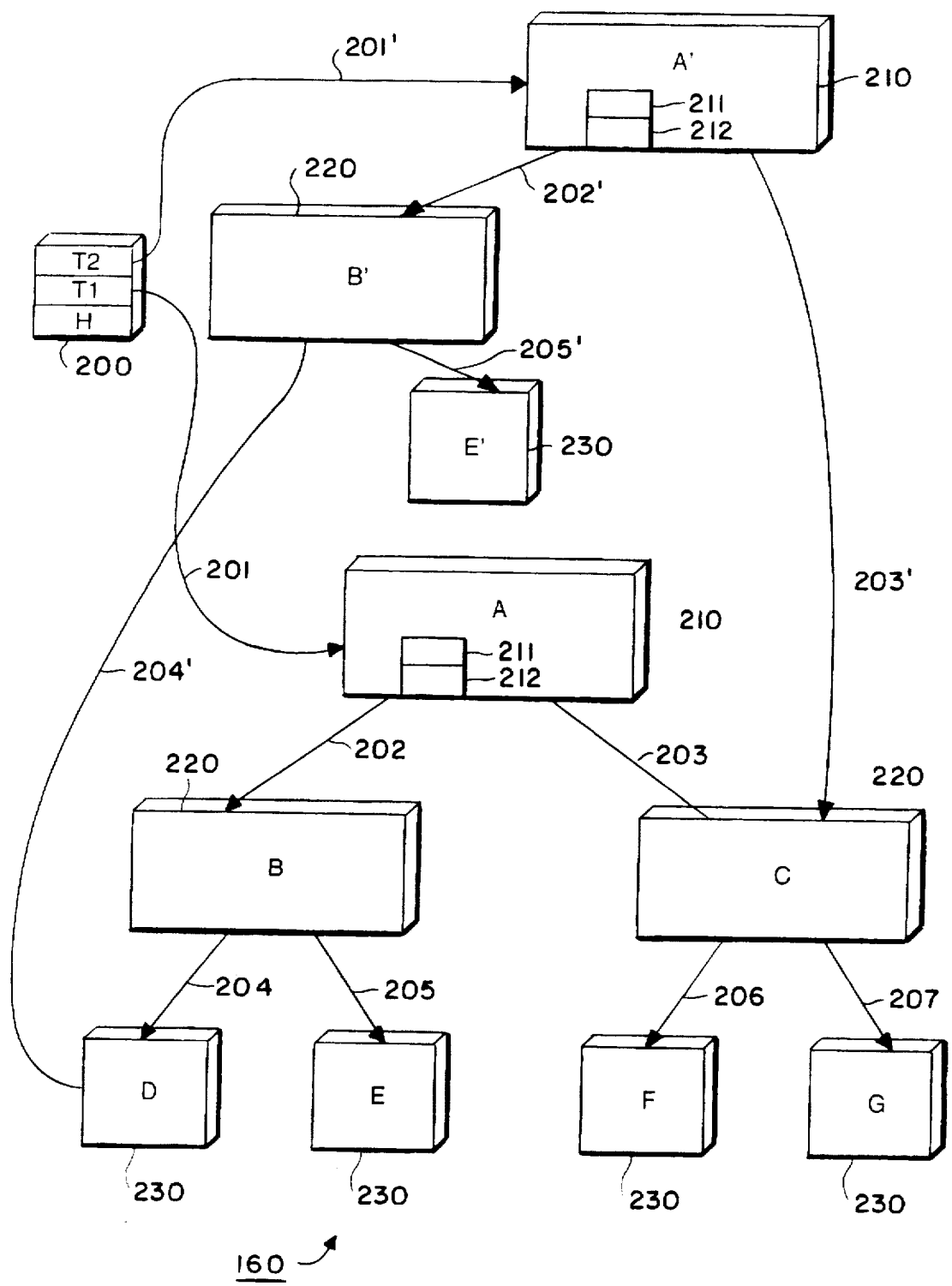
FIG. 3 is a block diagram of the data structure of FIG. 2 at a later instant in time.

FIG. 3 shows the database 160 of FIG. 2, according to the invention, at some later time T2. Modifications to the data nodes may have required commensurate changes in the index nodes. The modifications are generally indicated by the prime symbol ('). For example, the modifications may have altered the contents or size of a data or index records, necessitating, perhaps, a physical relocation thereof. In most traditional databases, the temporal evolution of the database is lost since index and data records are generally modified in place. That is, superseded data and index information of the database are generally overwritten.

However, in the database 160 according to the invention, as shown in FIG. 3, the historical evolution of the database is generally preserved. In other words, according to the invention, the states of the database, over time, as will be described in further detail below, can be recovered. Preserving the evolution of the database 160 means that physical media storing the index records and data records should not be overwritten, unless in the special case where the data are so old or "stale" to be of no immediate usefulness. In this case, the stale data can be archived, so that the physical media can be reclaimed.

In the example illustrated in FIG. 3, modification of the database 160 has necessitated changes in the data and index nodes. The modified nodes are generally indicated as A', B', and E'. Note, the original data structure of nodes A–G remains preserved. Modified node A' has pointers 202' and 203' addressing nodes B' and C, respectively, and modified index node B' has a pointer 205' for locating modified data node E'.

To reflect that the database 160 now has effectively two roots, e.g., node A and A', the home location (H) 200 has been modified to include two pointers 201 and 201' associated with times T1 and T2, respectively. Thus, at any subsequent time, the state of the database 160 at time T1 can be examined, by following pointer 201 from the home location 200, and the state of the database 160 at time T2 can be derived by following the pointer 201'. Note, that a view of the database at time T2, e.g. following the pointer 201', reveals data nodes D, E', F, and G, but not node E. It should now be apparent that the database 160 can continue to evolve as data and index records are modified by creating additional pointers in the home location 200. And, and more importantly, the chronological evolution of the database 160 over time is preserved. That is, as illustrated, the evolution of the database progresses from the bottom of the Figure to the top.

Figure 4:
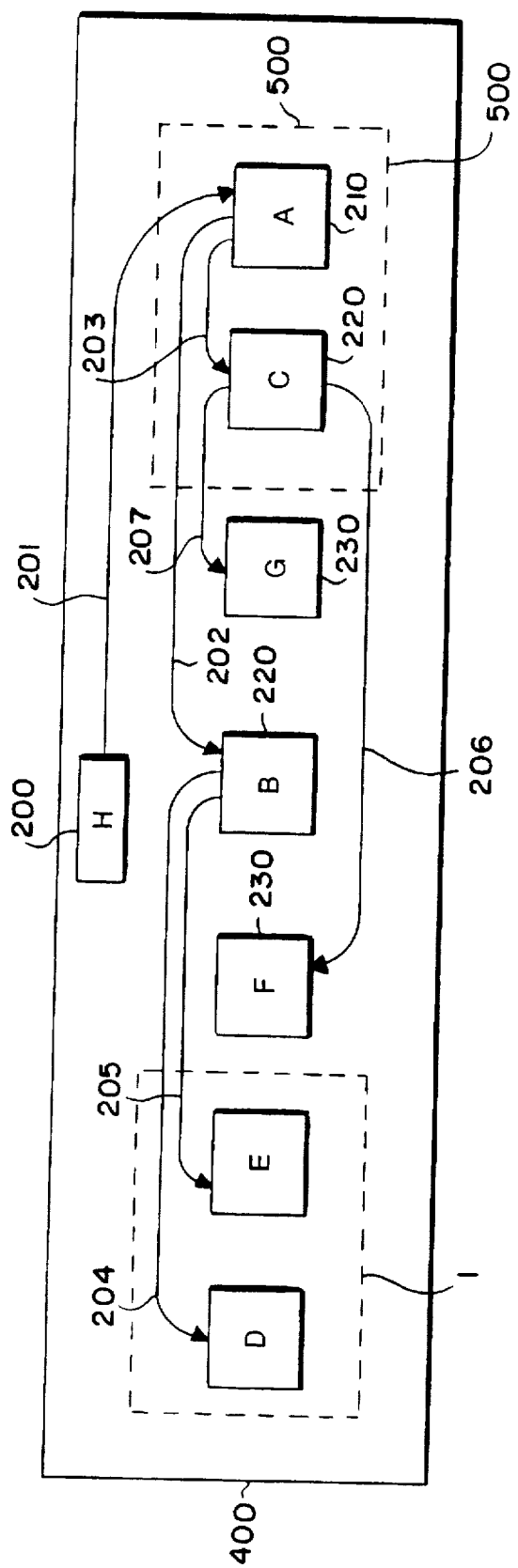
FIG. 4 is a mapping of the data structure of FIG. 2 onto a storage media of FIG. 1 according to the invention.

FIG. 4 shows an exemplary embodiment of mapping the data structure 160 onto a physical media using temporal, as well as, spatial networking. In FIG. 4, reference numeral 400 generally indicates the portion of the physical media of the disk 150 of FIG. 1 which has been allocated for storing the database 160. The home location 200 which stores the address of the root node A 210 is known. Generally, this means that the only information which is stored at a fixed location physical location in the database 160 is the information stored at the home location 200.

In the database 160, the nodes, e.g. data and index records, of the tree 200 are chronologically written to the media 400 in a bottom-first/top-last order. The bottom-level data nodes 230 are written, time-wise, before the intermediate-level index nodes 220 which point to them. The top-level root node 210 is written last. This time-wise sequencing of the written data is reflected in the left-to-right ordering of the nodes in FIG. 4, or the bottom-to-top arrangement of FIG. 3.

In a preferred embodiment, the chronological sequencing is maintained by storing the data at successively higher "logical" addresses of the media. Thus, it will be known that data written at lower logical addresses are older than data written at higher logical addresses. And, furthermore, data at a higher level of the hierarchical relationship will also have a higher logical address than data at a lower level.

The ordering of the logical addresses is achieved, in part, by chronologically writing data to the media 400 as segments, for example, the first segment 1, and the last segment 500. A segment is the unit of data transfer between the disk cache 121 and the disk 150 of FIG. 1. The segments can occupy one or more discrete media blocks of the disk 150. If the media blocks occupied by a particular segment are arranged physically contiguous, read and write performance can be improved. The size of each segment typically is in the range of 100 Kbytes to 10 Mbyte.

Figure 5:
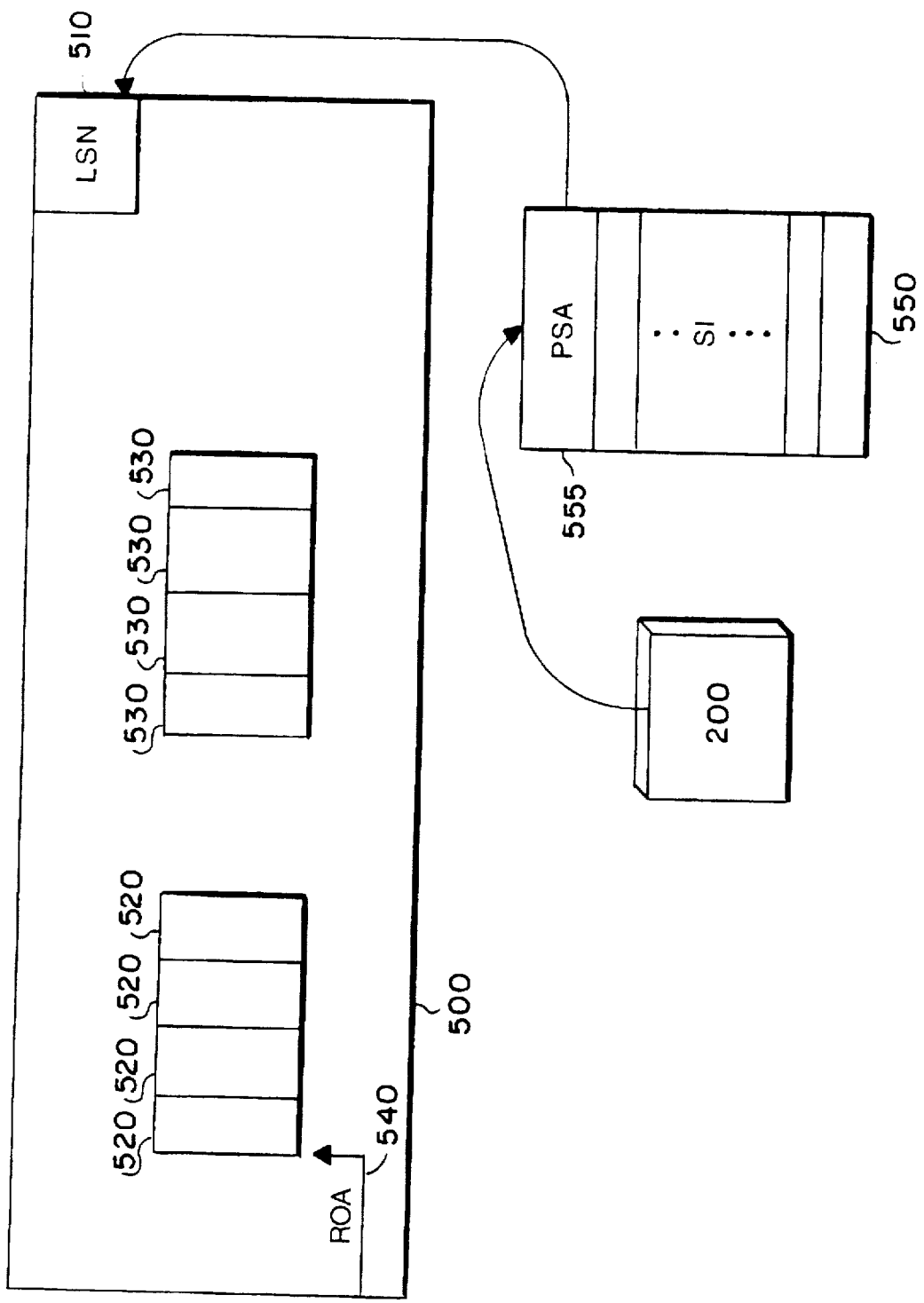
FIG. 5 is a block diagram a segment of the media.

FIG. 5 shows the details of one of the segment, for example, segment 500. Associated with each segment 500 is a unique logical segment number (LSN) 510. Logical segment numbers 510 can be assigned to the segments in a monotonically increasing order as the segments are written to the media 400.

Therefore, the logical segment numbers (LSN), in addition to uniquely identifying the segments, also, indicate the relative age, or chronological order in which the segments were written to the media 400. The LSN of a segment increases in value each time a new segment is written to the log. A segment having a higher LSN is always written later in time than a segment having a lower LSN. Once a LSN is assigned to a segment, it will never change, even if the physical location of the segment is changed. In effect, the logical segment numbers can be used as pointers into space and time. The logical sequence numbers not only give the location of data but also the relative age thereof.

The logical-to-physical mapping between the logical segment numbers and the physical media can be performed by means of a segment index (SI) 550. The segment index 550 can be stored separately, on the media 400 as, for example, a list. The head of the list can correspond to the last segment written, and the next entry on the list can be the next previous segment written, and so forth. The address of the segment index 550 can be stored at the home location 200. The SI 550 establishes a one-to-one correspondence between the logical segment number 510 and a physical segment addresses (PSA) 555 of the segment. The segment index 550 allows for the optimal arrangement of the segments on the media, as well as the relocation of segments without disturbing the logical relationships, e.g., space and time, among the segments.

When all of the data in a particular segment have been modified the segment is deemed to be "stale" and no longer accessible from the root of the database. Physical media occupied by stale segments can be recycled for new data. When a segment is recycled, the segment index 550 is marked to reflect that the logical segment number 510 associated with the now stale segment is no longer in use. The logical segment number 510, in order to preserve uniqueness, is of course never recycled, only the media is.

Although the basic physical access unit of the database 160 is the segment, data can be logically accessed at the record level, for example, data records 520, and index records 530. Therefore, associated with each record is a record off-set address (ROA) 540 which indicates the relative location of the record within the segment, expressed, for example, as a byte address. Thus, if a "node" pointer is expressed as a concatenation of the LSN 510 and the ROA 540, e.g., "ROA_LSN," the location on the media 400 where the referenced data are stored can readily be determined. Note, that the pointers as described here, in contrast with prior art pointers, have spatial, temporal, and physical attributes. The pointers indicate: where the information is located on the media, when the data were created, and how to get to the data.

Figure 6:
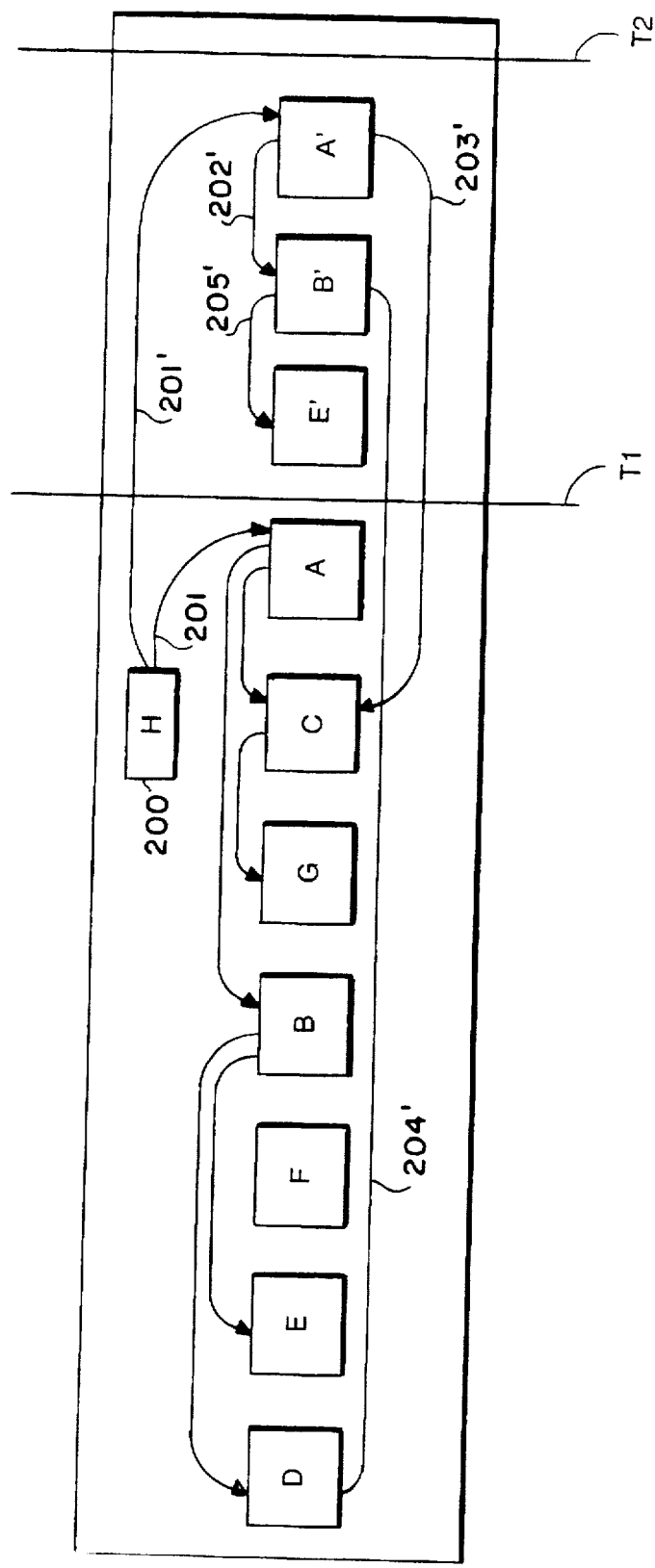
FIG. 6 is a mapping of the data structure of FIG. 3 onto the storage media.

FIG. 6 shows the state of the database 160 at time T2 corresponding to FIG. 3. During the evolution of the database 160 from time T1 to time T2, as described above, the nodes A, B, and E, e.g. their associated records, were modified. The modified nodes A', B', E' are written to the media in a bottom-first/top-last order. Therefore, in order to view the state of the database at any point in time, it is only necessary determine the LSN of the root at that point in time and follow the pointers down the tree. This view is called a "snap-shot" of the database.

From time to time, it is necessary to make a copy of the information stored in the database for back-up purposes to ensure that information will not be lost due to a failure. A failure can be due to environmental conditions, breakdown in hardware or software, or operationally induced failures.

In accordance with the principles of the invention, the back-up, full or incremental, can substantially be performed on-line without major disruption to normal operations. The invention also permits a timely recovery of lost information, so that normal operations can quickly be restored after a failure. Furthermore, information can be recovered selectively, without first having to restored the entire back-up copy.

In the preferred embodiment of the invention, the back-up is performed, in part, by capturing a consistent read-only state of the database with a snap-shot. After the snap-shot is taken, continued access and modification of the database may continue, while the back-up copy is made. During the making of the back-up copy, media storing data of the snap-shot cannot be reclaimed since the back-up preserves an exact state of the back-up. As the segments are copied to the back-up media, space can be reclaimed.

In simplest terms, taking a snap-shot writes all data of the database 160 to the media 400. Typically, during normal operation of the database 160, frequently accessed data, such as the index records are usually maintained in the disk cache 121 of the memory 120 of FIG. 1. Therefore, taking a snap-shot means transferring modified, or "dirty" data from the disk cache 121 to the disk 150 in segment, or partial segment units as described above.

As the data are written, the pointers are updated, and the records are written in a bottom-first/top-last temporal and spatial order. Since the disk cache 121 typically only stores a fraction of the total database, and not all data in the cache 121 are modified or dirty, the taking of a snap-shot can be done fairly quickly. After the entire database is resident on the media, the logical segment number 510 of the last segment written is stored at the home location 200. This LSN 510 defines the starting point for providing a consistent view of the database at that instant in time suitable for back-up. As soon as the home location 200 has been updated, with a new time-stamp and top-level pointer, real-time modifications of the database 160, e.g. normal operations, can resume. The invention guarantees that subsequent modifications to the database 160 will not disturb previous states of the database.

Figure 7:
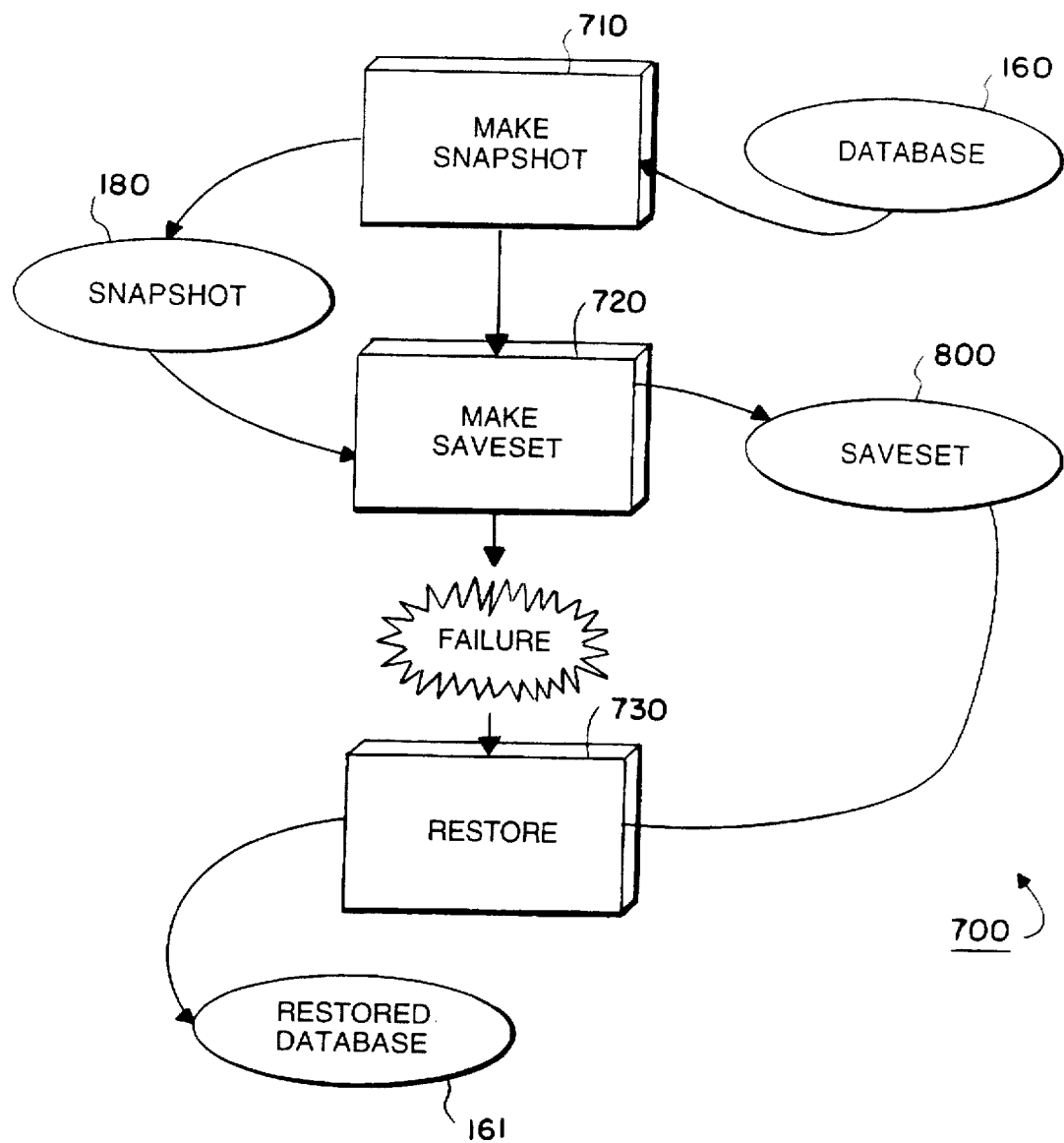
FIG. 7 is a flow diagram of a back-up procedure.

FIG. 7 shows an overview of a process 700 which can be used to back-up the database 160, and restoring the database after a failure. In step 710 the read-only "snapshot" 180 is taken of the database 160. In essence, the snap-shot forces the entire database from the cache 121 to the storage media, and determines the highest LSN at the time of the snap-shot. In step 520, the snapshot is copied to the back-up media, for example, the magnetic tape 156 as a "saveset" 800. Copying the snap-shot means copying all segments which are located by following the pointers from the root at the time of the snap-shot. During the back-up, "stale" segments are preferably not transferred to the back-up media. Instead of logically traversing the tree to locate data to be copied, a physical copy can be done during back-up using the information stored in the segment index 550.

After a failure, the information of the database can be recovered into a "restored" database 161 from the saveset 800 during the restore step 730. Since the database 160 is structured chronologically, any information time-wise preceding the snap-shot is part of the saveset 800, and information written to the media after the snap-shot is not. Thus, the database 160 can remain accessible for on-line access while the saveset 800 is created in step 720.

According to the invention, the saveset 800 can either be a full saveset or an incremental saveset. The full saveset includes all segments of the database 160 up to the time of the snap-shot. The incremental saveset only includes those segments which have been written since the last back-up. For example, with reference to FIGS. 3 and 6, an incremental back-up at time T2 would only copy segments storing data associated with modified nodes A', B', and E'.

Figure 8:
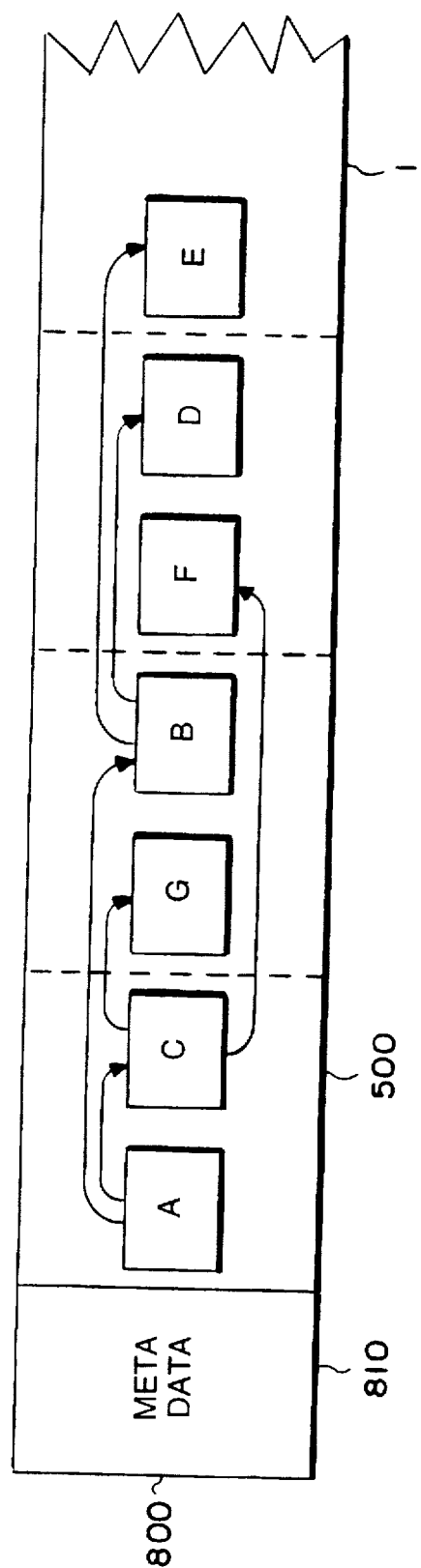
FIG. 8 is a saveset created by the procedure of FIG. 7.

FIG. 8 shows the structure of the saveset 800 according to the invention. The structure defines how the information of the snapshot 180 is stored on the target back-up media, e.g., the magnetic tape 156. The saveset 800 includes metadata 810 and the segments, e.g., the segments 500 to 1. The metadata 810 simply identifies the saveset 800, and describes the characteristics of the database 160 of which it is a back-up. Metadata 810 includes the largest logical segment extant at the time of the snap-shot, the time the snapshot was created, and any other information useful for identifying the back-up. Database characteristics can include the segment size, media blocking factors, and so forth. The metadata 810 is used during the restore step 730 of FIG. 7 to configure the restored database 161. The metadata 810 also includes information which maps the LSNs to their physical location on the tape media. This information is similar to what is maintained in the segment index 550 of the disk media. This mapping information can be used during a recovery to read specific segments while skipping over intervening segments.

In accordance with the principles of the invention, the segments of the saveset 800 are written to the saveset media in top-first/bottom-last order. In other words, the ordering of the segments in the saveset is spatially and temporally inverted from the ordering of the segments in the database. In the back-up saveset 800, the segments having a higher logical segment number precede segments having a lower logical segment number.

This means that the hierarchical tree structure of the database 160 is written to the back-up media by reading the segments of the database 160 in a reverse chronological order, e.g. high-to-low LSNs. Thus, the most recent root node is written to a segment of the saveset 800 before the segment containing the index nodes, and the segments of the index nodes are written before the data node segments. If the back-up media is magnetic tape, the reading and writing of segments can be interleaved to permit maximum speed "streaming" of the tape.

Storing the segments in the top-first/bottom-last order enables complete and selective recovery of information with only a single read pass of the back-up media while traversing the hierarchical structure in a top-to-bottom order. This is a significant advantage if the media is magnetic tape. Repositioning tape is notoriously inefficient if the tape is subjected to frequent reversals of directions.

The segments of the saveset, other than the inverted logical ordering, are an exact image of the segments of the volume. For example, during the make saveset step 720 of FIG. 7, the segments are treated opaquely, avoiding deciphering and processing of their contents.

Figure 9:
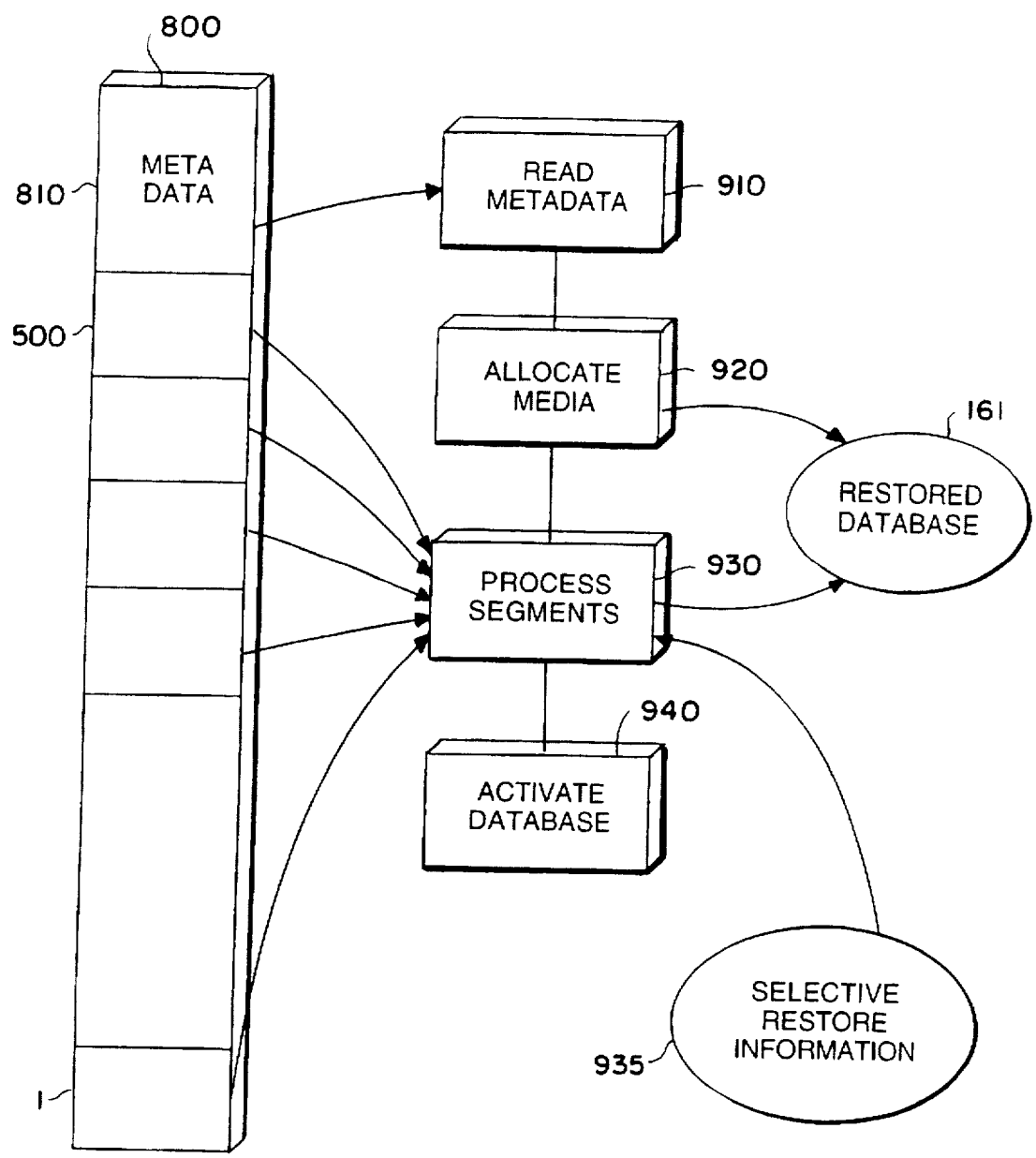
FIG. 9 flow diagram of a process for restoring a saveset.

FIG. 9 shows the steps that can be performed to restore the database. During the restoration process, the media 161 is not visible to the rest of the system 100. In step 910, the metadata 810 are read from the saveset 800. In step 920, the media for receiving the restored database is allocated and initialized according to the metadata 810. Reading the metadata 810 also recovers the segment index.

In step 930, the segments are read from the saveset 800 in the order, e.g., reverse chronological, e.g., top-first/bottom-last, from when they were stored. For a full recovery, the segments can be copied transparently without any further processing. The logical segment numbers are not altered, although their physical locations may change from what they were on the original media. This means that the segments index 550 may need to be recreated during the restoration depending on the logical-to-physical mapping that is used during restoration. If reading is interleaved with writing, the tape can stream at maximum speed. Lastly, in step 940, the back-up process can notify the system that restored database 161 is ready for use.

Although the restore process 900 has been optimized for performing a full back-up and restore, partial recovery of data records is also facilitated. Furthermore, because of the top-first/bottom-last ordering of the information in the saveset 800, selective recovery is possible while making a single pass through the back-up media. All that is required, that the step 930 is supplied with selective restore information 935 of what data are to be recovered. As the saveset 800 is traversed, the records are optimally recovered by only visiting segments storing significant information, and skipping others.

The unique ordering of the database 160 according to the invention leads to some practical advantages. It is very easy and quick to create a read-only "snap-shot" of the database at an instant in time. The snap-shot can be used to perform an on-line back-up without interfering with on-going database operations. Moreover, the back-up can be performed without any further interpretation of the information being copied to speed up the process. In other words, the back-up can be a very fast physical copy from the on-line media to the back-up media.

In addition, the inventive organization also enables true incremental back-up. In an incremental back-up, only those portions of the database which have been modified since the last back-up are copied to the back-up media. In traditional databases, incremental back-ups can consume substantial system resources since it is not always easy to determine what data have been modified since the last back-up. Furthermore, the present database organization allows for a logical restoration of portions of the database after a failure. During the logical restoration, only specified information is restored to the on-line media from the back-up copy.

Another embodiment of the invention allows for the viewing of only those data records of the database which have been modified during a specific relative time interval. Furthermore, it is possible to view only those records which are qualified by some predetermined logical selection criteria, for example, a Boolean combination of one or more keys.

In a traditional database, time-based operations can only be done if a separate journal were maintained, or if the records included transaction time-stamps. In either case, a time-consuming scan of the entire database or journal would be required to locate only those records which are qualify by both the "key" and "time" restrictions.

With reference again to FIGS. 3 and 6, the snap-shots at time T1 and T2 are taken at, for example, twenty-four hour intervals. It is desired, to view only those selected data records which were modified during the last twenty-four interval. Therefore, a view of database 160 begins at the current root node A' 210. Depending on the logical selection criteria, for example by some key, the index structure is traversed, and only the qualifying data records stored in segments written during the span T1 to T2 are extracted.

With the inventive structure as shown in FIG. 6, it is possible to terminate the traversal as soon as the first segment written after time T1 has been read. Any further traversal of the database is unnecessary. This means, that any pointer crossing the T1 time boundary , for example pointers 203' and 204', do not need to be followed, since it is known that referenced data were modified prior to the time interval of interest. This is a significant improvement the processes used with traditional databases.

The invention is not limited by the embodiments shown in the drawings and detailed in the description, which is given by way of example, and not of limitation, but only in accordance with the scope of the appended claims.

We claim:

1. An apparatus for maintaining records of a database in a memory of a computer system, comprising:

means for generating a plurality of records temporally in a chronological order;

means for storing the plurality of records at successive addresses of the memory according to the chronological order in which the plurality of records are generated; and means for organizing the plurality of records stored at the successive addresses into a hierarchical data structure while maintaining the chronological order of the records at the successive addresses.

2. A computerized method for maintaining records of a database in a memory of a computer system, comprising the steps of:

generating a plurality of records temporally in a chronological order;

organizing the plurality of records in a hierarchical order in a data structure; and storing the plurality of records at successive addresses of the memory while maintaining the hierarchical order of the records, the plurality of records being stored at the successive addresses of the memory according to the chronological order in which each record is generated.

3. The method of claim 2 wherein the step of storing writes records as a plurality of segments, the segments having monotonically increasing segment numbers according to the chronological and hierarchical order of the records of the data structure, each segment being a unit of data transfer.

4. The method of claim 2 further comprising:

supplying a logical selection criteria and a time-based selection criteria, the time-based selection criteria having a first time and a chronologically later second time;

reading the data structure in a reverse chronological order beginning at the second time and ending at the first time; and while reading the data structure in the reverse chronological order, concurrently selecting data according to the logical selection criteria in a depth-last order.

5. The method as in claim 2 wherein the data structure has levels including a bottom level and a top level, the step of organizing includes a step of associating each record with a particular one of the levels, and the step of storing proceeds in a bottom level to top level order when storing the records.

6. The method in claim 2 further comprising the steps of:

generating modified records temporally in the chronological order, each modified record being derived from a previously generated record in the data structure;

organizing the modified records in the hierarchical order in the data structure; and storing the modified records at other successive addresses of the memory while maintaining the hierarchical order of the modified records, the modified records being stored at the other successive addresses of the memory according to the chronological order in which each modified record is generated.

7. The method as in claim 2 further comprising the steps of:

generating a new record temporally in the chronological order;

organizing the new record in the hierarchical order in the data structure; and storing the new record at another successive address of the memory according to the chronological order in which the new record is generated while maintaining the hierarchical order.

8. The method as in claim 2 wherein the memory is a first memory and the record stored last in the chronological order is a root record of the data structure; and further comprising the steps of:

reading records from the first memory in a reverse chronological order, proceeding from the root record to those records coupled to the root record by a logical path; and writing the records read from the first memory to a second memory in the reverse chronological order in which the records are read so as to produce a back-up of the data structure.

9. The method as in claim 8 further comprising:

detecting a failure of the first memory;

reading the records from the second memory in the reverse chronological order in which the records are stored in the second memory; and storing the records read from the second memory to successive addresses of the first memory in chronological order so as to restore the data structure.

10. The method as in claim 8 further comprising:

storing a first time associated with the creation of the backup of the data structure;

modifying the data structure until a second time, the second time being relatively later than the first time;

reading an incremental portion of the data structure from the first memory in the reverse chronological order beginning at the second time and ending at the first time; and writing the incremental portion to a third memory in the reverse chronological order to create an incremental back-up.

11. The method as in claim 10 further comprising:

detecting a failure in the first memory;

reading, in the reverse chronological order, the records from the second memory and the incremental portion from the third memory; and writing the records read from the third memory and the incremental portion to the first memory in the chronological order to restore the data structure.

* * * * *